(12) United States Patent
Hirozawa

(10) Patent No.: US 9,217,239 B2
(45) Date of Patent: Dec. 22, 2015

(54) HYBRID CONSTRUCTION MACHINE

(71) Applicant: KOBELCO CONSTRUCTION MACHINERY CO., LTD., Hiroshima-shi (JP)

(72) Inventor: Mitsunori Hirozawa, Hiroshima (JP)

(73) Assignee: KOBELCO CONSTRUCTION MACHINERY CO., LTD., Hiroshima-shi (JP)

(*) Notice: Subject to any disclaimer, the term of this patent is extended or adjusted under 35 U.S.C. 154(b) by 0 days.

(21) Appl. No.: 14/464,841

(22) Filed: Aug. 21, 2014

(65) Prior Publication Data
US 2015/0086315 A1    Mar. 26, 2015

(30) Foreign Application Priority Data
Sep. 24, 2013    (JP) .................................. 2013-196359

(51) Int. Cl.
| | |
|---|---|
| *B60K 6/22* | (2007.10) |
| *E02F 9/20* | (2006.01) |
| *B60L 11/18* | (2006.01) |

(Continued)

(52) U.S. Cl.
CPC ................. *E02F 9/2091* (2013.01); *B60K 6/22* (2013.01); *B60L 11/1861* (2013.01); *E02F 9/128* (2013.01); *E02F 9/2075* (2013.01); *E02F 9/2095* (2013.01); *E02F 9/2217* (2013.01); *Y10S 903/903* (2013.01)

(58) Field of Classification Search
CPC .................................. B60K 6/22; B60W 20/00
USPC ................... 180/65.21, 65.22, 65.265, 65.27, 180/65.285
See application file for complete search history.

(56) References Cited

U.S. PATENT DOCUMENTS

| | | | |
|---|---|---|---|
| 6,718,845 B2* | 4/2004 | Menzies ......................... | 74/512 |
| 6,789,335 B1* | 9/2004 | Kinugawa et al. .............. | 37/348 |

(Continued)

FOREIGN PATENT DOCUMENTS

| | | |
|---|---|---|
| EP | 2 602 388 A2 | 6/2013 |
| JP | 2006-336306 | 12/2006 |

(Continued)

OTHER PUBLICATIONS

Extended European Search Report issued Mar. 6, 2015 in Patent Application No. 14181956.5.

*Primary Examiner* — Hau Phan
(74) *Attorney, Agent, or Firm* — Oblon, McClelland, Maier & Neustadt, L.L.P.

(57) ABSTRACT

Provided is a hybrid construction machine capable of preventing overcharge, comprising: an engine; a generator-motor; a hydraulic pump; a hydraulic actuator to be operated by the hydraulic pump as a hydraulic pressure source; an actuator regeneration section to make a regenerative action of generating actuator regenerated-electric-power through return fluid from the hydraulic actuator; an electric storage device; a charging-rate detector; and a control section. The control section performs: causing the electric storage device to be charged with electric power generated by the generator-motor and the actuator regenerated-electric-power; causing the generator-motor to make a motor action through electric power stored in the electric storage device to assist the engine; and a regeneration control including stopping the generator action and restricting the actuator regenerated-electric-power, when a detected charging rate of the electric storage device is not smaller than a preset charging-rate limitation value.

4 Claims, 4 Drawing Sheets

(51) Int. Cl.
*E02F 9/12* (2006.01)
*E02F 9/22* (2006.01)

(56) References Cited

U.S. PATENT DOCUMENTS

| | | | | |
|---|---|---|---|---|
| 7,069,673 | B2 * | 7/2006 | Kagoshima et al. | 37/348 |
| 7,487,023 | B2 * | 2/2009 | Komiyama et al. | 701/50 |
| 8,286,740 | B2 * | 10/2012 | Kagoshima et al. | 180/65.27 |
| 8,362,629 | B2 * | 1/2013 | Weber et al. | 290/4 D |
| 8,606,451 | B2 * | 12/2013 | Abdel-Baqi et al. | 701/22 |
| 8,626,403 | B2 * | 1/2014 | Onsager et al. | 180/65.265 |
| 8,649,927 | B2 * | 2/2014 | Gustavsson | 701/22 |
| 8,662,969 | B2 * | 3/2014 | Shimomura et al. | 180/65.22 |
| 2008/0111508 | A1 * | 5/2008 | Dasgupta et al. | 318/139 |
| 2011/0254513 | A1 * | 10/2011 | Kagoshima | 320/162 |
| 2011/0288711 | A1 * | 11/2011 | Yanagisawa | 701/22 |
| 2012/0082536 | A1 | 4/2012 | Kawashima et al. | |
| 2012/0104770 | A1 * | 5/2012 | Jacob | 290/40 B |
| 2012/0109472 | A1 * | 5/2012 | Yanagisawa | 701/50 |
| 2013/0151087 | A1 | 6/2013 | Doi et al. | |
| 2013/0300128 | A1 | 11/2013 | Fujishima et al. | |
| 2013/0300378 | A1 | 11/2013 | Sugiyama | |
| 2013/0307443 | A1 * | 11/2013 | Hirozawa | 318/139 |
| 2014/0054902 | A1 * | 2/2014 | Kawaguchi et al. | 290/40 B |

FOREIGN PATENT DOCUMENTS

| | | |
|---|---|---|
| JP | 2009-127643 | 6/2009 |
| WO | WO 2012/102351 A1 | 8/2012 |
| WO | WO 2012/105345 A1 | 8/2012 |
| WO | WO 2010/143628 A1 | 12/2012 |

\* cited by examiner

HYBRID CONSTRUCTION MACHINE

BACKGROUND OF THE INVENTION

1. Field of the Invention

The present invention relates to a hybrid construction machine configured to make a regenerative action through return fluid from a hydraulic actuator such as a boom cylinder.

2. Description of the Background Art

The background art of the present invention will be described by taking an excavator shown in FIG. 7 as an example.

This excavator comprises: a crawler-type lower traveling body 1; an upper slewing body 2 mounted on the lower traveling body 1 slewably about an axis O perpendicular to a ground surface; an attachment AT attached to the upper slewing body 2; an engine; and a hydraulic pump configured to be driven by the engine. The attachment AT includes a boom 3, an arm 4, a bucket 5, and a plurality of hydraulic actuators, namely, a boom cylinder 6, an arm cylinder 7 and a bucket cylinder 8. The lower traveling body 1 is configured to be driven by a traveling drive unit using a traveling hydraulic motor as a drive source, and the upper slewing body 2 is configured to be driven by a slewing drive unit using a slewing hydraulic motor as a drive source. The attachment AT is configured to be actuated by hydraulic fluid supplied from the hydraulic pump.

In the case of a hybrid type, the above excavator is further equipped with a generator motor configured to make a generator action and a motor action, and an electrical storage device, wherein the generator motor and the hydraulic pump are connected to the engine. The generator-motor is operable to charge the electrical storage device through the generator action, and to be driven by electric power stored in the electrical storage device, on a timely basis, to make the motor action, thereby assisting the engine.

As such a hybrid excavator, there has been known one type configured to make a regenerative action through return fluid from a hydraulic actuator, e.g., of the energy of return fluid from the boom cylinder 6 being subject to a boom-lowering operation, and to charge an electrical storage device with regenerated-electric-power generated through the regenerative action, as disclosed in JP 2006-336306A (Patent Literature 1). The Patent Literature 1 discloses making a slewing regenerative action during a slewing operation in addition to a boom-lowering regenerative action during the boom-lowering operation; more specifically, it is disclosed that, during slewing braking, the electrical storage device is charged with electric power regenerated by a slewing motor acting as a slewing drive source while regenerative braking force is generated.

There has also been known another type which comprises a slewing drive source composed of a hydraulic motor to which a generator is coupled to make a slewing regenerative action in the same manner as above, as disclosed in JP 2009-127643A (Patent Literature 2).

In the above heretofore known techniques, when a regenerative action through return fluid from a hydraulic actuator is made in a situation where the electrical storage device has a relatively high charging rate, the electric power generated through the regenerative action brings the electrical storage device into so-called "overcharge" beyond a proper charging rate, and the overcharge may involve a failure and life-shortening of the electrical storage device. Particularly, during an operation of lowering the boom 3 of the excavator as shown in FIG. 7, a possibility of overcharge increases, because return fluid is flowed out of the boom cylinder 6 at a large flow rate to allow larger regenerated-electric-power, specifically, larger boom-lowering regenerated-electric-power, to be generated. Besides, in a hybrid construction machine where both the slewing regenerative action and the boom-lowering regenerative action is made, not only the possibility of overcharge is further increased during a combined slewing and boom-lowering operation in which the two regenerative actions are simultaneously performed but also slewing braking performance may be deteriorated due to difficulty in regeneration of the entire slewing energy.

As means to prevent the overcharge, there could be consuming an unnecessary part of regenerative power through a regeneration resistor; however, this involves energy loss by throwing out regenerated-electric-power in the form of heat, and requires addition of special equipment including a relatively large-sized resistor for consuming the regenerated-electric-power as the regeneration resistor, a control device for the resistor, and further a device for treating heat generated from the regeneration resistor. This brings device layout especially in an excavator having severe restrictions in terms of space brings into difficulty and involves a significant increased cost. Using a large-capacity electrical storage device hard to overcharge also involves the same disadvantages as above, in terms of cost and installation space.

SUMMARY OF THE INVENTION

It is an object of the present invention to provide a hybrid construction machine capable of protecting an electrical storage device from overcharge with regenerated-electric-power generated through return fluid from a hydraulic actuator while involving neither addition of a large regeneration resistor nor upsizing of the electrical storage device.

Provided by the present invention is a hybrid construction machine which comprises: an engine; a generator-motor configured to make a generator action and a motor action; a hydraulic pump configured to be driven by the engine; a hydraulic actuator configured to be operated by the hydraulic pump as a hydraulic pressure source; an actuator regeneration section configured to make a regenerative action of generating actuator regenerated-electric-power through return fluid from the hydraulic actuator; an electric storage device capable of being charged and discharging electric power stored therein; a charging-rate detector configured to detect a charging rate of the electric storage device; and a control section configured to perform: causing the electric storage device to be charged with electric power generated by the generator-motor making the generator action and the actuator regenerated-electric-power generated by the actuator regeneration section making the regenerative action; causing the generator-motor to make the motor action through the electric power stored in the electric storage device to thereby assist the engine; and a regeneration control of stopping the generator action of the generator-motor and restricting the actuator regenerated-electric-power to be generated by the actuator regeneration section when the charging rate of the electric storage device detected by the charging-rate detector is equal to or greater than a preset charging-rate limitation value.

DESCRIPTION OF THE PREFERRED EMBODIMENTS

With reference to the drawings, the present invention will now be described based on one embodiment thereof. This embodiment is one example in which the present invention is applied to the hybrid excavator shown in FIG. 7.

Figure 1:
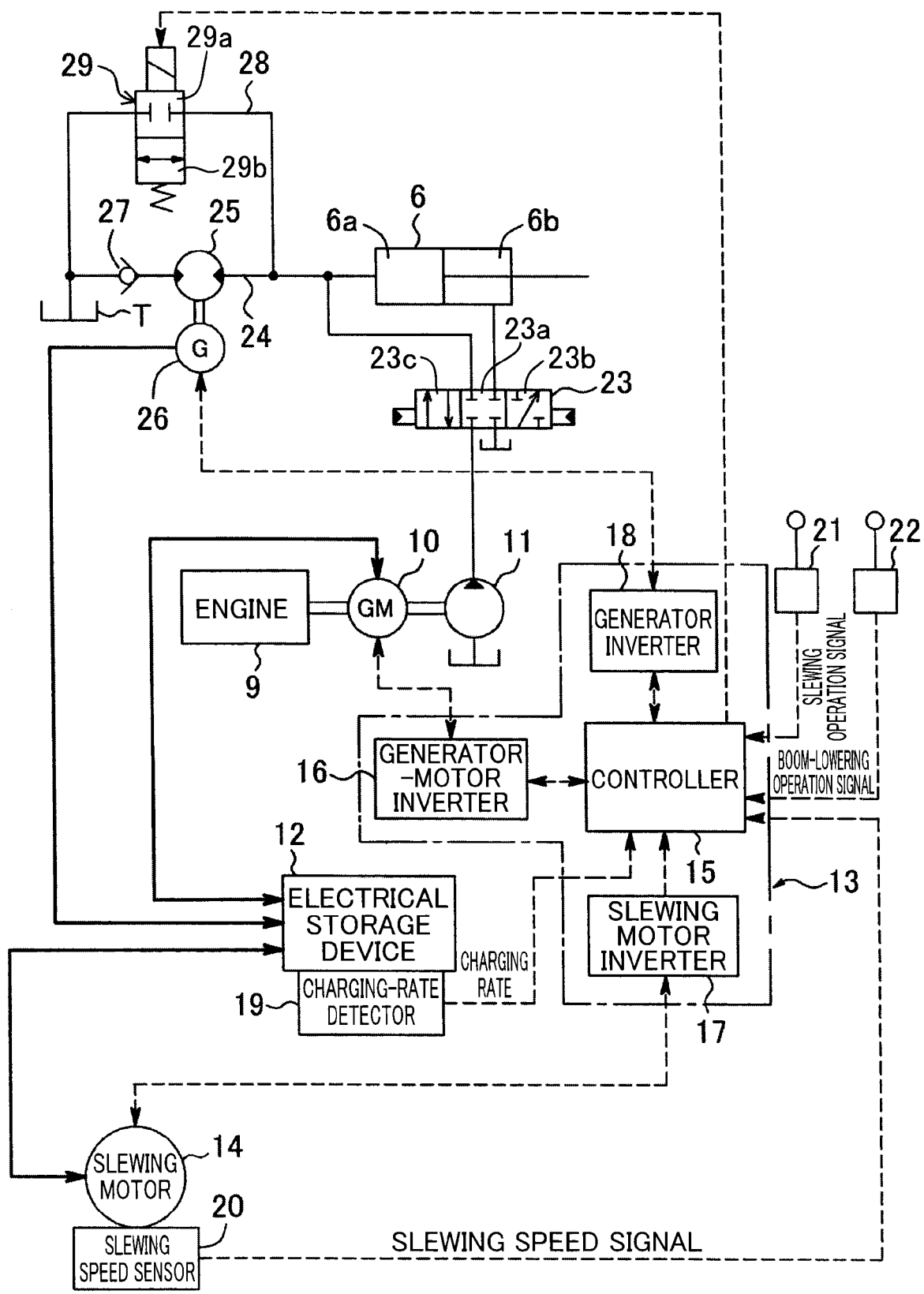
FIG. 1 is a system block diagram showing a substantial part of a hybrid construction machine according to one embodiment of the present invention.

FIG. 1 shows a substantial part of a hybrid excavator according to this embodiment. In addition to the components shown in FIG. 7, the hybrid excavator according to this embodiment includes an engine 9, a generator-motor 10, a hydraulic pump 11, an electrical storage device 12, a control section 13 and a slewing motor 14. In FIG. 1, a set of thick solid lines, a set of broken lines and a set of normal solid lines denote a power circuit, a signal circuit and a hydraulic circuit, respectively.

The generator-motor 10 and the hydraulic pump 11 are connected to the engine 9 in a tandem (or parallel) arrangement to be driven by the engine 9. The generator-motor 10 is configured to make a generator action and a motor action. The hydraulic pump 11 is configured to be driven by the engine 9 to thereby discharge hydraulic fluid.

The electrical storage device 12 is constituted of, for example, a nickel-hydrogen battery or a lithium-ion battery, and functions as a power supply. The electrical storage device 12 is capable of storing therein electric power, i.e., being charged, and discharging electric power stored therein. The electrical storage device 12 is connected to the generator-motor 10.

The control section 13 is configured to output a control signal to control a discharge action of the electrical storage device 12 according to a charging rate, a generator action of the generator-motor 10 and a motor action of the generator-motor 10. Specifically, the control section 13 is configured to cause the generator-motor 10 to make the generator action and send electric power generated by the generator action to the electrical storage device 12 to thereby charge the electrical storage device 12, when the charging rate of the electrical storage device 12 is lowered, and to cause the generator-motor 10, on a timely basis, to make the motor action through the electric power discharged from the electrical storage device 12 to thereby assist the engine 9.

Figure 7:
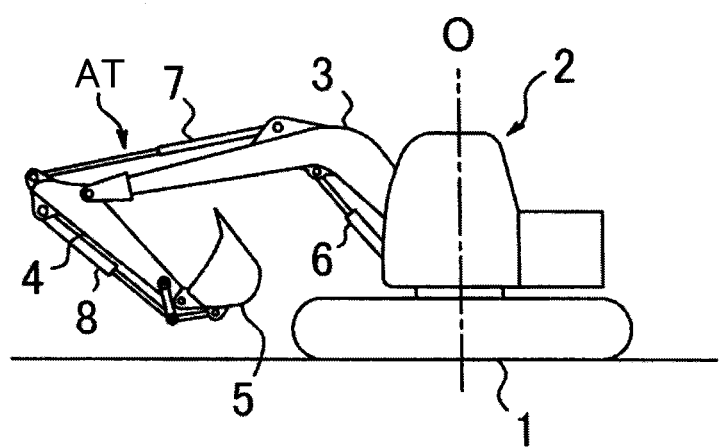
FIG. 7 is a schematic side view showing a hybrid excavator which is one example of a hybrid construction machine to which the present invention is applicable.

The slewing motor 14 is a slewing drive source for slewing the upper slewing body 2 shown in FIG. 7. The slewing motor 14 is connected to the electrical storage device 12 to be rotationally driven by electric power stored in the electrical storage device 12. On the other hand, during slewing braking, i.e., braking against the slewing, the slewing motor 14 makes the generator action to generate electric power, with which the electrical storage device 12 is charged.

The control section 13 includes a controller 15, a generator-motor inverter 16, a slewing-motor inverter 17 and a generator inverter 18. The generator-motor inverter 16 is configured to control an operation of the generator-motor 10. The slewing-motor inverter 17 is configured to control an operation of the slewing motor 14. The generator inverter 18 is configured to perform a generator control for below-mentioned boom-lowering regeneration, i.e., for a regeneration during the boom-lowering operation in which the boom 3 shown in FIG. 7 is operated downward.

The hybrid excavator according to this embodiment further comprises a plurality of detectors. The plurality of detectors includes a charging-rate detector 19 configured to detect a charging rate of the electrical storage device 12 and a slewing speed detector 20 configured to detect a slewing speed of the upper slewing body 2, i.e., a rotational speed of an output shaft of the slewing motor 14. The detectors 19, 20 are configured to generate respective detection signals indicative of the charging rate and the slewing speed, respectively. These detection signals are input into the controller 15.

The hybrid excavator according to this embodiment further comprises a plurality of manipulation devices. The plurality of manipulation devices includes a slewing manipulation lever 21 and a boom manipulation lever 22. To the slewing manipulation lever 21, a manipulation for slewing the upper slewing body 2 is applied by an operator. The slewing manipulation lever 21 is operable to generate α slewing operation signal, which is an electric signal corresponding to the manipulation applied to the slewing manipulation lever 21, and input the generated slewing operation signal into the controller 15. To the boom manipulation lever 22, a manipulation for extending or retracting the boom cylinder 6 is applied by an operator. The boom manipulation lever 22 is operable to generate α boom operation signal, which is an electric signal corresponding to the manipulation applied to the boom manipulation lever 22, and input the generated boom operation signal into the controller 15. The boom manipulation signal includes a below-mentioned boom-lowering operation signal. The boom manipulation lever 22 is connected to a non-shown boom remote control valve configured to generate α pilot signal which is a boom-operation hydraulic signal corresponding to the manipulation applied to the boom manipulation lever 22.

The hybrid excavator according to this embodiment further comprises a plurality of control valves provided for the hydraulic actuators respectively. The plurality of control valves includes a control valve 23 for the boom cylinder 6. The control value 23 is interposed between the hydraulic pump 11 and the boom cylinder 6 and configured to be operated by the pilot signal output from the boom remote control valve to control supply of hydraulic fluid to the boom cylinder 6. The extension/retraction drive of the boom cylinder 6 is thereby controlled. Not graphically shown are respective manipulation devices and control valves for other hydraulic actuators, namely, the arm cylinder 7 and the bucket cylinder 8 constituting the attachment AT shown in FIG. 7, the traveling hydraulic motor and others.

The boom cylinder 6 has an extension-side hydraulic chamber 6a into which hydraulic fluid for actuating the boom cylinder 6 in an extension direction is introduced and a retraction-side hydraulic chamber 6b into which hydraulic fluid for actuating the boom cylinder 6 in a retraction direction is introduced. The control value 23 comprises a hydraulic-pilot-controlled selector valve having a neutral position 23a, a boom-lowering position 23b and a boom-raising position 23c, which positions are selected by the pilot signal. The control valve 23 is operable: to isolate the boom cylinder 6 from the hydraulic pump 11 when set to the neutral position 23a; to form a fluid path for introducing hydraulic fluid discharged from the hydraulic pump 11 into the retraction-side hydraulic chamber 6b and a fluid path for returning hydraulic fluid flowed out from the extension-side hydraulic chamber 6a to a tank when set to the boom-lowering position 23b; and to form a fluid path for introducing hydraulic fluid discharged from the hydraulic pump 11 into the extension-side hydraulic chamber 6a and a fluid path for returning hydraulic fluid flowed out from the retraction-side hydraulic chamber 6b to the tank when set to the boom-raising position 23c.

The hybrid excavator according to this embodiment further comprises an actuator regeneration section 30 configured to make a regenerative action through return fluid from the boom cylinder 6 which is one of the hydraulic actuators. The principle of the regenerative action is as follows.

The pressure in the extension-side hydraulic chamber 6a is always raised because the gravity acting on the attachment AT always applies to the boom cylinder 6 a load in a boom-lowering direction, i.e., a direction of retracting the boom cylinder 6. This gives a certain amount of energy to the hydraulic fluid flowed out from the extension-side hydraulic chamber 6a, namely, return fluid, during the boom-lowering operation.

The actuator regeneration section 30 is configured to make a regenerative action of generating regenerated-electric-power by the energy of the return fluid, i.e., the hydraulic fluid flowed out from the extension-side hydraulic chamber 6a during the boom-lowing operation, thereby recovering the energy as electric power. Specifically, the actuator regeneration section 30 in this embodiment includes a regeneration circuit 24, a regeneration motor 25, a regeneration generator 26, a bypass circuit 28 and a flow regulating valve 29.

The regeneration circuit 24 forms a flow path of the return fluid from the extension-side hydraulic chamber 6a of the boom cylinder 6 to a tank T. The regeneration circuit 24 is provided with a check valve 27 for preventing a back-flow midway thereof. The regeneration motor 25 is constituted of a hydraulic motor and provided in the regeneration circuit 24 to be rotationally driven by the energy of the return fluid flowed in the regeneration circuit 24. The regeneration generator 26 is connected to the regeneration motor 25 to be driven by the regeneration motor 25 to thereby generate regenerated-electric-power. With the regenerated-electric-power, the electrical storage device 12 can be charged.

The bypass circuit 28 is connected to the regeneration circuit 24, in parallel to the regeneration motor 25, that is, in such a manner as to bypass the regeneration motor 25. The flow regulating valve 29 is provided in the bypass circuit 28 to regulate a flow rate of the hydraulic fluid flowed in the bypass circuit 28. The flow regulating valve 29 in this embodiment is constituted of a solenoid valve controllable by an electric signal input thereto from the controller 15, configured to be operated between a blocking position 29a for blocking off the bypass circuit 28 and an open position 29b for opening the bypass passage 28 to thereby regulate a bypass flow rate, i.e., a flow rate of hydraulic fluid flowed in the bypass passage 28. Through the bypass-flow-rate regulating action by the flow regulating valve 29, the flow rate of hydraulic fluid passing through the regeneration circuit 24 is regulated, and the rotational speed of the regeneration motor 25 and the output of the regeneration generator 26 are thus adjusted.

The control value 23 is set to the boom-lowering position 23b of the neutral, boom-lowering and boom-raising positions 23a, 23b and 23c when a manipulation for the boom-lowering operation is applied to the boom manipulation lever 22, thereby blocking return fluid flowed out from the extension-side hydraulic chamber 6a of the boom cylinder 6. The entire amount of the return fluid is thus permitted to be flowed in the regeneration circuit 24 or the bypass circuit 28, as hydraulic fluid for regeneration. A part of the hydraulic fluid flowed in the regeneration circuit 24 rotates the regeneration motor 25 to cause the regeneration generator 26 to generate electric power.

As above, the electrical storage device 12 according to this embodiment is charged not only with electric power generated by the generator-motor 10 through the generator action (this electric power will hereinafter be referred to as "basic generated electric power") but also with slewing regenerated-electric-power which is regenerated-electric-power generated by the slewing motor 14 during the slewing braking and with boom-lowering regenerated-electric-power which is electric power generated by the regeneration generator 26 during the boom-lowering operation.

On the premise of the aforementioned configuration, the controller 15 performs the following controls based on the charging-rate detection signal, the slewing-speed detection signal, the slewing operation signal and a boom-lowering operation signal.

(i) In a Situation where the Charging Rate Falls within a Safe Range

Figure 2:
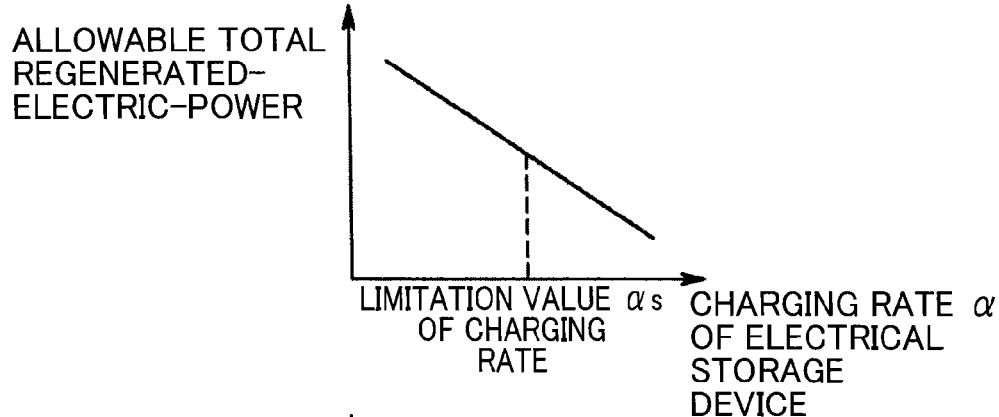
FIG. 2 is a graph representing a relationship between a charging rate of an electric storage device and an allowable total regenerated-electric-power, in the hybrid construction machine.

FIG. 2 represents a relationship between the charging rate α of the electric storage device 12 and an allowable total regenerated-electric-power E, i.e., a total regenerated-electric-power with which the electric storage device 12 can be charged (=the slewing regenerated-electric-power+the boom-lowering regenerated-electric-power). In a situation where the charging rate α is less than a charging-rate limitation value αs which is preliminarily set as a value for judging that charging should be restricted when the charging rate is equal to or greater than the value, that is, the charging rate α falls within a safe range free from the risk of overcharge, the controller 15 permits, via the inverters 16 to 18, the electrical storage device 12 to be charged with the slewing regenerated-electric-power and the boom-lowering regenerated-electric-power, in addition to the basic generated electric power, with no limitation. In summary, the controller 15 performs a normal control.

(ii) In a Situation where the Charging Rate is Equal to or Greater than the Charging-Rate Limitation Value αs Permitting the electrical storage device 12 to be charged with no limitation in a situation where the charging rate is equal to or greater than the charging-rate limitation value αs may cause overcharge. Particularly, during the combined slewing and boom-lowering operation, both of the slewing regenerated-electric-power and the boom-lowering regenerated-electric-power are generated to increase total regenerated-electric-power increases, which is likely to involve not only an increase in possibility of overcharge but also deterioration in slewing regeneration braking performance. For this reason, the controller 15 performs a regeneration control of stopping the generator action of the generator-motor 10 and restricting the boom-lowering regenerated-electric-power to reduce the allowable total regenerated-electric-power in accordance with an increase in the charging rate α.

Figure 3:
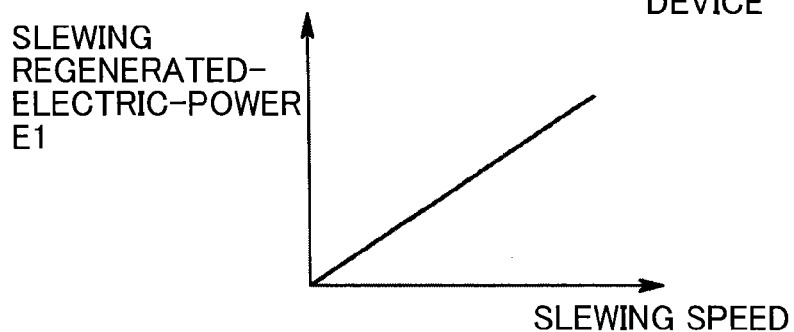
FIG. 3 is a graph representing a relationship between a slewing speed of an upper slewing body and a slewing regenerated-electric-power, in the hybrid construction machine.

FIG. 3 represents a relationship between a slewing speed and a slewing regenerated-electric-power E1. As shown in FIG. 3, the slewing regenerated-electric-power E1 increases in proportion to an increase in the slewing speed.

Figure 4:
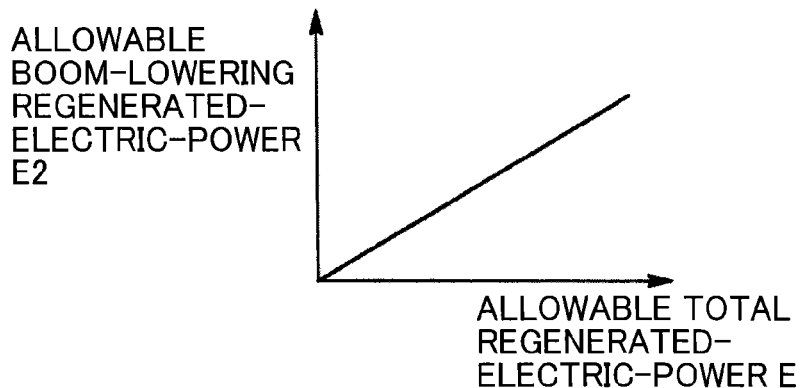
FIG. 4 is a graph representing a relationship between the allowable total regenerated-electric-power and an allowable boom-lowering regenerated-electric-power, in the hybrid construction machine.
Figure 5:
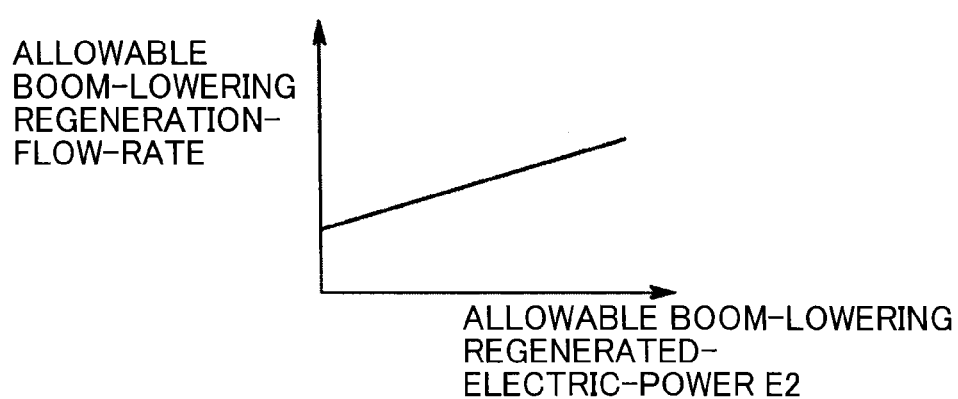
FIG. 5 is a graph representing a relationship between the allowable boom-lowering regenerated-electric-power and an allowable boom-lowering regeneration-flow-rate, in the hybrid construction machine.

FIG. 4 represents a relationship between the allowable total regenerated-electric-power E and an allowable boom-lowering regenerated-electric-power E2. As shown in FIG. 4, the controller 15 performs a regeneration control of reducing the allowable boom-lowering regenerated-electric-power E2 in proportion to a decrease in the allowable total regenerated-electric-power E. Specifically, the controller 15 operates to change a degree of opening of the flow regulating valve 29 to regulate the boom-lowering regeneration-flow-rate which is a flow rate of hydraulic fluid in the regeneration circuit 24, in such a manner as to reduce an allowable boom-lowering regeneration-flow-rate in proportion to a decrease in the allowable boom-lowering regenerated-electric-power E2, as shown in FIG. 5, and thus reduce the output of the regeneration generator 26. This regeneration control makes it possible to reduce the boom-lowering regenerated-electric-power during the combined slewing and boom-lowering operation to prevent overcharge, and ensure the slewing regenerative action to ensure the slewing braking performance.

Figure 6:
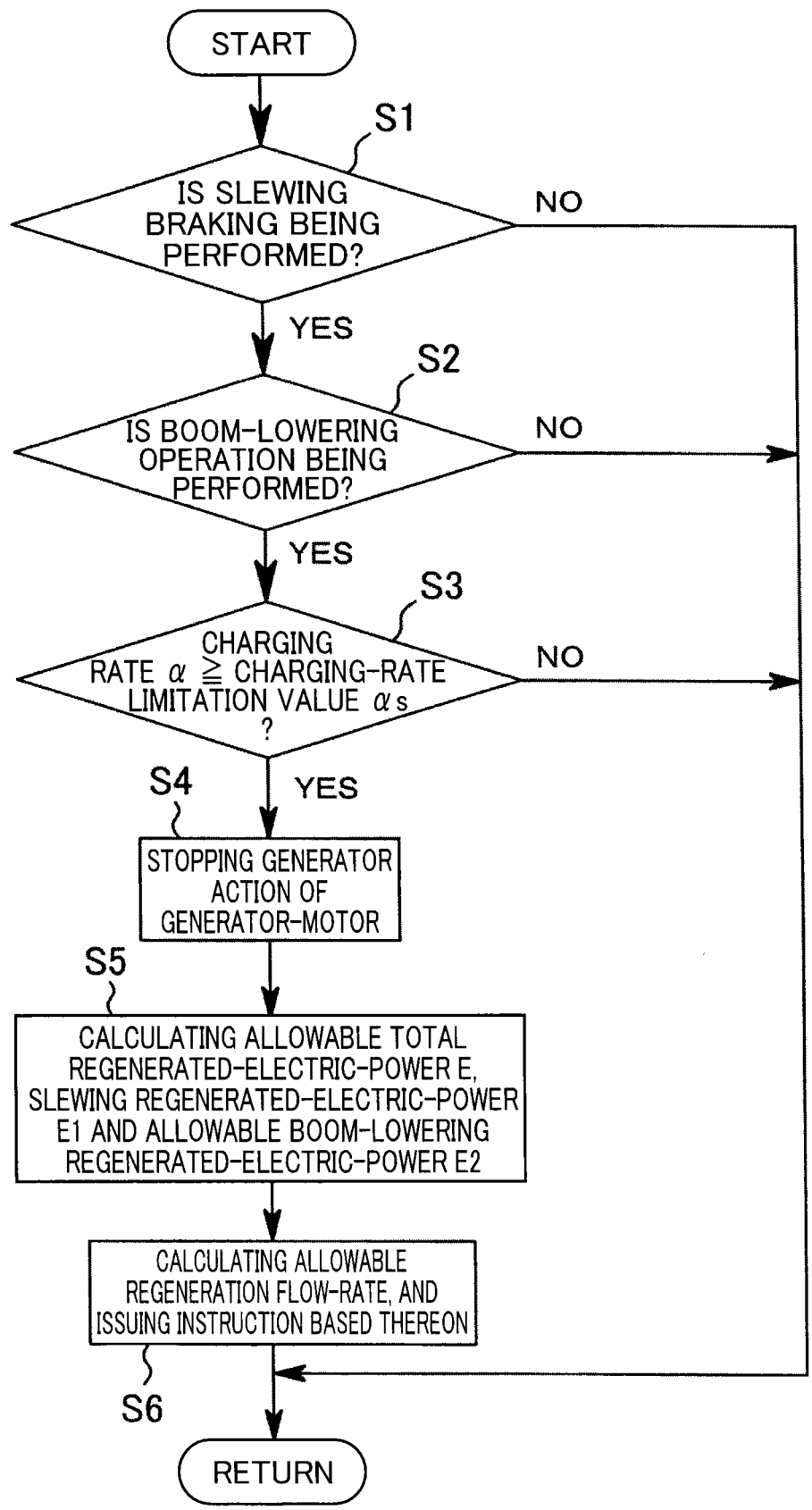
FIG. 6 is a flowchart showing a control operation of a controller in the hybrid construction machine.

Further will be described the specific control operation which the controller 15 executes, based on the flowchart in FIG. 6.

Upon start of the control, the controller 15 judges whether or not the slewing braking is being performed and whether or not the boom-lowering operation is being performed, in Steps S1 and S2, respectively. In summary, the controller 15 judges whether or not the combined slewing and boom-lowering operation is being performed. If judging that the combined operation is being performed, that is, if judging YES in the Steps S1 and S2, the controller 15 judges whether the charging rate $\alpha$ of the electrical storage device 12 is less than the charging-rate limitation value $\alpha s$, or equal to or greater than the charging-rate limitation value $\alpha s$, in Step S3. The judgment on whether or not the slewing braking is being performed in the Step S1 can be made, for example, based on the slewing operation signal and change in the slewing speed.

If judging YES in the Step 3, that is, if judging that the charging rate $\alpha \geq$ charging-rate limitation value $\alpha s$, the controller 15 stops the generator action of the generator-motor 10 in Step S4 and calculates the allowable total regenerated-electric-power E, the slewing regenerated-electric-power E1 and the allowable boom-lowering regenerated-electric-power E2, in Step S5.

Based on the result of the calculation, the controller 15 calculates, in subsequent Step S6, an allowable regeneration-flow-rate which makes electric power generated through a boom-lowering regeneration action be equal to the allowable boom-lowering regenerated-electric-power E2, and issues a degree-of-opening instruction based on the allowable regeneration-flow-rate to the flow regulating valve 29. Subsequently, the controller 15 repeats the process starting from the Step S1. If judging NO in any of the Steps S1 to S3, the controller 15 just repeats the routine from the Step S1.

The hybrid excavator according to this embodiment allows the following advantageous effects to be obtained.

(I) The regeneration control of stopping the generator action of the generator-motor 10 and restricting the boom-lowering regenerated-electric-power when the charging rate $\alpha$ is equal to or greater than the charging-rate limitation value $\alpha s$ protects the electrical storage device 12 from overcharge.

(II) The protect from overcharge involves neither any increase in capacity and size of the electrical storage device 12 nor any addition of a regeneration resistor.

(III) Performing the regeneration control during the boom-lowering operation in which large regenerated-electric-power is generated by a large flow rate of return fluid enables the overcharge prevention effect to be enhanced.

(IV) The restriction of the boom-lowering regenerated-electric-power is performed only in a situation where there exists a possibility of overcharge and not performed in any other situation, which permits both adequate charge action and overcharge prevention to be established.

(V) The control of the boom-lowering regenerated-electric-power based on the regulation of the flow rate of return fluid from the boom cylinder 6 during the boom-lowering operation can be achieved by a simple control and at a low equipment cost, as compared to the case of electrically controlling an amount of electric power used for charging of the entire boom-lowering regenerated-electric-power instead of the regulation of return fluid.

(VI) The protection from overcharge is highly effective especially in the regeneration control performed during the combined slewing and boom-lowering operation involving a large amount of total regenerated-electric-power and exerting an influence upon the slewing braking performance. In addition, it contributes to an ensured slewing braking function.

(VII) Since the allowable boom-lowering regenerated-electric-power E2 with which the electrical storage device 12 can be charged is calculated based on the allowable total regenerated-electric-power E with which the electrical storage device 12 can be charged based on a detected charging rate $\alpha$ and the slewing regenerated-electric-power E1, the regeneration control using the allowable boom-lowering regenerated-electric-power E2 as a target value can reliably prevent the total regenerated-electric-power from exceeding the allowable total regenerated-electric-power E. This allows both of preventing overcharge and ensuring the slewing braking function to be more reliably established.

It is to be understood that the present invention is not limited to the above embodiment. The present invention also includes, for example, the following modifications.

(1) The regenerated-electric-power to be restricted in the present invention is not limited to the boom-lowering regenerated-electric-power in the above embodiment. In the case of a hybrid construction machine having an actuator regeneration section configured to make a regenerative action with respect to another hydraulic actuator in place of or in addition to the boom-lowering, the regeneration control may be performed for actuator regenerated-electric-power with respect to the above hydraulic actuator, or both of the boom-lowering regenerated-electric-power and the actuator regenerated-electric-power with respect to the above hydraulic actuator.

(2) The regeneration control may be performed during a single boom-lowering operation.

(3) In addition to stopping the generator action of the generator-motor 10 as in the above embodiment, during the regeneration control, may be performed causing the generator-motor 10 to make the motor action to assist the engine.

(4) The present invention may be applied to not only an excavator but any other construction machine such as a dismantling machine or a crushing machine, to be constructed using an excavator as a base body.

As above, the present invention provides a hybrid construction machine capable of protecting an electrical storage device from overcharge with regenerated-electric-power generated through return fluid from a hydraulic actuator while involving neither addition of a large regeneration resistor nor upsizing of the electrical storage device. The hybrid construction machine comprises: an engine; a generator-motor configured to make a generator action and a motor action; a hydraulic pump configured to be driven by the engine; a hydraulic actuator configured to be operated by the hydraulic pump as a hydraulic pressure source; an actuator regeneration section configured to make a regenerative action of generating actuator regenerated-electric-power through return fluid from the hydraulic actuator; an electric storage device capable of being charged and discharging electric power stored therein; a charging-rate detector configured to detect a charging rate of the electric storage device; and a control section configured to perform: causing the electric storage device to be charged with electric power generated by the generator-motor making the generator action and the actuator regenerated-electric-power generated by the actuator regeneration section making the regenerative action; causing the generator-motor to make the motor action through the electric power stored in the electric storage device to thereby assist the engine; and a regeneration control of stopping the generator action of the generator-motor and restricting the actuator regenerated-electric-power to be generated by the actuator regeneration section when the charging rate of the electric storage device detected by the charging-rate detector is equal to or greater than a preset charging-rate limitation value.

In this hybrid construction machine, stopping the generator action of the generator-motor and restricting the boom-lowering regenerated-electric-power when the charging rate is equal to or greater than the charging-rate limitation value enable the electrical storage device to be protected from overcharge. The overcharge prevention requires neither any increase in capacity or size of the electrical storage device nor any addition of a regeneration resistor. Furthermore, performing the restriction of the boom-lowering regenerated-electric-power only in a situation where there exists a possibility of overcharge allows both adequate charging action and overcharge prevention to be established.

The actuator regeneration section preferably includes: a regeneration circuit connected to the hydraulic actuator to allow return fluid from the hydraulic actuator to be flowed therein; a regeneration motor provided in the regeneration circuit to be rotationally driven by the return fluid from the hydraulic actuator; a flow regulating value configured to regulate a regeneration-flow-rate which is a flow rate of the return fluid flowing in the regeneration circuit; and a regeneration generator configured to be driven by the regeneration motor to generate regenerated-electric-power, wherein the control section is configured to perform the regeneration control through the regulation of the regeneration-flow-rate by the flow regulating valve. The control of the boom-lowering regenerated-electric-power thus performed through the regulation of the flow rate of return fluid can be achieved by a simple control and at a low equipment cost, as compared to the case of electrically controlling an amount of electric power used for charging of the entire boom-lowering regenerated-electric-power instead of the regulation of the flow rate of return fluid.

For example, it is preferable that: the above hybrid construction machine further comprises: a lower traveling body; an upper slewing body slewably mounted on the lower traveling body; and a working attachment mounted to the upper slewing body and including a boom and a boom cylinder for moving the boom; the hydraulic actuator includes the boom cylinder; the regeneration circuit is connected to one side of the boom cylinder from which side the return fluid is flowed out so as to generate boom-lowering regenerated-electric-power as the actuator regenerated-electric-power through the return fluid from the boom cylinder, during a boom-lowering operation; and the control section is configured to perform the regeneration control with respect to the boom-lowering regenerated-electric-power. This allows a marked overcharge prevention effect to be obtained.

More preferably the hybrid construction machine further comprises a slewing drive unit for slewing the upper slewing body, the slewing drive unit being configured to make a regenerative action of generating slewing regenerated-electric-power and a slewing braking action of braking the slewing of the upper slewing body, during slewing braking, wherein the electric storage device is configured to be charged with the slewing regenerated-electric-power generated through the regenerative action, and the control section is configured to perform the regeneration control during a combined slewing and boom-lowering operation in which the electric storage device is charged with both of the slewing regenerated-electric-power and the boom-lowering regenerated-electric-power.

As mentioned above, the combined slewing and boom-lowering operation involves a large amount of total regenerated-electric-power, which is likely to cause overcharge and, if regenerated-electric-power cannot be sufficiently acquired, slewing energy cannot be sufficiently recover, resulting in insufficient slewing braking force for performing a normal slewing braking; therefore, performing the regeneration control during the combined slewing and boom-lowering operation as described above allows highly-effective overcharge prevention and ensuring the slewing braking function to be achieved.

More preferably, the control section is configured to derive an allowable regenerated-electric-power with which the electric storage device can be charged from the detected charging rate and derive an allowable boom-lowering regenerated-electric-power which is a boom-lowering regenerated-electric-power with which the electric storage device can be charged from the allowable regenerated-electric-power and the slewing regenerated-electric-power, and configured to perform the regeneration control in such a manner as to obtain the allowable boom-lowering regenerated-electric-power. This regeneration control can reliably prevent a total regenerated-electric-power from exceeding the allowable total regenerated-electric-power, thereby permitting preventing overcharge and ensuring slewing braking function to be more reliably established.

This application is based on Japanese Patent application No. 2013-196359 filed in Japan Patent Office on Sep. 24, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A hybrid construction machine comprising:
an engine;
a generator-motor configured to make a generator action and a motor action;
a hydraulic pump configured to be driven by the engine;
a hydraulic actuator configured to be operated by the hydraulic pump as a hydraulic pressure source;
an actuator regeneration section configured to make a regenerative action of generating actuator regenerated-electric-power through return fluid from the hydraulic actuator;
an electric storage device capable of being charged and discharging electric power stored therein;
a charging-rate detector configured to detect a charging rate of the electric storage device; and
a control section configured to perform: causing the electric storage device to be charged with electric power generated by the generator-motor through the generator action and the actuator regenerated-electric-power generated by the actuator regeneration section through the regenerative action; causing the generator-motor to make the motor action through electric power stored in the electric storage device to thereby assist the engine; and a regeneration control of stopping the generator action of the generator-motor and restricting the actuator regenerated-electric-power to be generated by the actuator regeneration section when the charging rate of the electric storage device detected by the charging-rate detector is equal to or greater than a preset charging-rate limitation value, wherein the actuator regeneration section includes: a regeneration circuit connected to the hydraulic actuator to allow return fluid from the hydraulic actuator to be flowed therein; a regeneration motor provided in the regeneration circuit to be rotationally driven by the return fluid from the hydraulic actuator; a flow regulating value configured to regulate a regeneration-flow-rate which is a flow rate of the return fluid flowing in the regeneration circuit; and a regeneration generator configured to be driven by the regeneration motor to generate regenerated-electric-power, wherein the control section is configured to perform the regeneration control through the regulation of the regeneration-flow-rate by the flow regulating valve.

2. The hybrid construction machine as defined in claim 1, which further comprises a lower traveling body, an upper slewing body slewably mounted on the lower traveling body, and a working attachment mounted to the upper slewing body and including a boom and a boom cylinder for moving the boom, wherein the hydraulic actuator includes the boom cylinder; the regeneration circuit is connected to one side of the boom cylinder, from which side the return fluid is flowed out, so as to generate boom-lowering regenerated-electric-power as the actuator regenerated-electric-power through the return fluid from the boom cylinder, during a boom-lowering operation; and the control section is configured to perform the regeneration control with respect to the boom-lowering regenerated-electric-power.

3. The hybrid construction machine as defined in claim 2, which further comprises a slewing drive unit for slewing the upper slewing body, the slewing drive unit being configured to make a regenerative action of generating slewing regenerated-electric-power and a slewing braking action of braking the slewing of the upper slewing body, during slewing braking, wherein the electric storage device is configured to be charged with the slewing regenerated-electric-power generated through the regenerative action, and the control section is configured to perform the regeneration control during a combined slewing and boom-lowering operation in which the electric storage device is charged with both of the slewing regenerated-electric-power and the boom-lowering regenerated-electric-power.

4. The hybrid construction machine as defined in claim 3, wherein the control section is configured to derive an allowable regenerated-electric-power with which the electric storage device can be charged, from the detected charging rate, and derive an allowable boom-lowering regenerated-electric-power which is a boom-lowering regenerated-electric-power with which the electric storage device can be charged, from the allowable regenerated-electric-power and the slewing regenerated-electric-power, the control section being configured to perform the regeneration control in such a manner as to obtain the allowable boom-lowering regenerated-electric-power.

* * * * *